(12) United States Patent
Shimazawa et al.

(10) Patent No.: US 7,551,408 B2
(45) Date of Patent: Jun. 23, 2009

(54) THIN FILM MAGNETIC HEAD, HEAD GIMBAL ASSEMBLY, AND HARD DISK DRIVE

(75) Inventors: Koji Shimazawa, Tokyo (JP); Kosuke Tanaka, Tokyo (JP); Tomoaki Shimizu, Tokyo (JP)

(73) Assignee: TDK Corporation, Tokyo (JP)

( * ) Notice: Subject to any disclaimer, the term of this patent is extended or adjusted under 35 U.S.C. 154(b) by 327 days.

(21) Appl. No.: 11/103,563

(22) Filed: Apr. 12, 2005

(65) Prior Publication Data
US 2005/0237677 A1 Oct. 27, 2005

(30) Foreign Application Priority Data
Apr. 21, 2004 (JP) ............... 2004-125547

(51) Int. Cl.
G11B 5/33 (2006.01)
(52) U.S. Cl. ............... 360/324.11; 360/324.12
(58) Field of Classification Search ............ 360/324.12, 360/327.3, 324.11, 314
See application file for complete search history.

(56) References Cited
U.S. PATENT DOCUMENTS 5,959,810 A * 9/1999 Kakihara et al. ....... 360/324.12
6,157,526 A * 12/2000 Watanabe et al. ...... 360/324.12
6,636,392 B2 10/2003 Ito et al.
6,731,479 B2 * 5/2004 Ooshima et al. ....... 360/324.12
6,888,706 B2 * 5/2005 Ooshima ............... 360/324.12
7,177,121 B2 * 2/2007 Kojima et al. .......... 360/324.12
7,248,445 B2 * 7/2007 Nishiyama ............... 360/324.1
2004/0264066 A1 12/2004 Shimizu et al.
2005/0018367 A1 1/2005 Terunuma et al.
2006/0152863 A1 * 7/2006 Freitag et al. .......... 360/324.12
2006/0198059 A1 * 9/2006 Sakai et al. ............. 360/324.12
2006/0221515 A1 * 10/2006 Carey et al. ............ 360/324.12

FOREIGN PATENT DOCUMENTS

| JP | 11-250419 | 9/1999 |
| JP | 2000-132817 | 5/2000 |
| JP | 2002-25019 | 1/2002 |
| WO | WO 97/11458 | 3/1997 |

* cited by examiner

*Primary Examiner*—Angel A. Castro
(74) *Attorney, Agent, or Firm*—Oblon, Spivak, McClelland, Maier & Neustadt, P.C.

(57) ABSTRACT

Both end portions of a magneto-resistive effect film form a junction taper shape and, at both end portions forming the junction taper shape, a pair of bias magnetic field applying layers are disposed via underlayers for applying a longitudinal bias magnetic field to a soft magnetic layer. Each of the underlayers is formed by a thin film made of at least one element selected from a group of Ru, Ti, Zr, Hf, and Zn or an alloy thin film containing, as a main component, at least one element selected from the group. Each of the bias magnetic field applying layers formed on the underlayers is formed by a hard magnetic layer and has a thickness of 200 Å or less (not including zero).

10 Claims, 9 Drawing Sheets

THIN FILM MAGNETIC HEAD, HEAD GIMBAL ASSEMBLY, AND HARD DISK DRIVE

BACKGROUND OF THE INVENTION

1. Field of the Invention

The present invention relates to a thin film magnetic head comprising a magneto-resistive effect element for reading as a signal a magnetic field strength of a magnetic recording medium or the like, and further relates to a head gimbal assembly and a hard disk drive each including such a thin film magnetic head.

2. Description of the Related Art

In recent years, following the improvement in areal recording density of a hard disk drive, improvement in performance of a thin film magnetic head has been required. As the thin film magnetic head, use has been widely made of a composite thin film magnetic head having a structure wherein a reproducing head comprising a read-only magneto-resistive effect element (hereinafter may also be referred to simply as "MR element"), and a recording head comprising a write-only induction-type electromagnetic transducer element are stacked relative to a substrate.

As the MR element, there can be cited an AMR element using an anisotropic magneto-resistive effect, a GMR element using a giant magneto-resistive effect, a TMR element using a tunnel-type magneto-resistive effect, or the like.

As the GMR element, a spin-valve GMR element has been often used. The spin-valve GMR element comprises a nonmagnetic layer, a soft magnetic layer formed on one surface of the nonmagnetic layer, a ferromagnetic layer formed on the other surface of the nonmagnetic layer, and a pinning layer (generally an antiferromagnetic layer) formed on the ferromagnetic layer on its side apart from the nonmagnetic layer. The soft magnetic layer is a layer that acts to change its magnetization direction depending on a signal magnetic field from the exterior. The ferromagnetic layer is a layer of which a magnetization direction is fixed by a magnetic field from the pinning layer (antiferromagnetic layer).

Large output and small Barkhausen noise are required as characteristics of the reproducing head. Generally, in order to reduce the Barkhausen noise, a bias magnetic field is applied to the MR element in a longitudinal direction (hereinafter, this bias magnetic field will be referred to as "longitudinal bias magnetic field"). The application of the longitudinal bias magnetic field to the MR element is carried out by, for example, disposing bias magnetic field applying layers each in the form of a permanent magnet, a stacked body of a ferromagnetic layer and an antiferromagnetic layer, or the like on both sides of the MR element.

In the case of applying the longitudinal bias magnetic field using the permanent magnets, use has generally been made of CoCrPt obtained by adding Cr to CoPt, in view of its large coercive force and high corrosion resistance. Further, as a material of an underlayer employed when forming a bias magnetic field layer of the permanent magnet, use is made of Cr or CrTi that can rest c-axes of CoCrPt of a hexagonal system in the film surface.

WO97/11458 (Patent Document 1) proposes that, in order to change orientation of crystal axes of a permanent magnet film to increase horizontal magnetization components in the film surface and in order to reduce the influence of a magneto-resistive effect film over the property of the permanent magnet film to uniform the property of the permanent magnet film, a ferromagnetic underfilm containing Fe and Cr as main components is placed at a tapered portion of an element and the permanent magnet film is formed thereon.

On the other hand, JP-A-H11-250419 (Patent Document 2) proposes that an underlayer of an element is made of at least one metal selected from a group of Cr, Ta, and Ti. It is described that the selection of such an underfilm is based on the fact that those metals each have a high melting point and high adhesion with a permanent magnet film or the like in manufacturing. The element disclosed in this publication is not of a spin-valve element structure, and there is no specific description about a stacked film structure and moreover there is no specific study for optimization of the thickness of the underlayer or the permanent magnet film.

Generally, when a magnetic field produced from bias magnetic field applying layers is large, the Barkhausen noise is reduced, which is thus preferable. Simultaneously, variation in reproduction waveform symmetry is suppressed. However, there is a problem that if an unnecessarily strong bias magnetic field is applied, the reproduction output is degraded.

In the current development trend, following track narrowing of reproducing heads and reduction in thickness of free layers in response to increase in density of hard disks, reduction in thickness of bias magnetic field applying layers has also been developed. Therefore, there has been required a film design around the bias magnetic field applying layers such that the optimum bias magnetic field can be achieved in response to the reduction in thickness of the whole element.

The present invention has been conceived under these circumstances and has an object to, by performing a film design around bias magnetic field applying layers so that an optimum bias magnetic field can be achieved in response to reduction in thickness of a whole element, provide a thin film magnetic head that produces a large reproduction output even with thin bias magnetic field applying layers, that is excellent in reproduction waveform symmetry with a little variation in reproduction waveform symmetry, and that achieves a small occurrence rate of the Barkhausen noise, and to further provide a head gimbal assembly and a hard disk drive each comprising such an improved thin film magnetic head.

SUMMARY OF THE INVENTION

For accomplishing the foregoing object, according to one aspect of the present invention, there is obtained a thin film magnetic head comprising a magneto-resistive effect element having a magneto-resistive effect film, wherein the magneto-resistive effect film is a multilayer film comprising a nonmagnetic layer, a ferromagnetic layer formed on one surface of the nonmagnetic layer, a soft magnetic layer formed on the other surface of the nonmagnetic layer, and a pinning layer formed so as to contact with one surface of the ferromagnetic layer (a surface of the ferromagnetic layer opposite to a surface thereof contacting with the nonmagnetic layer) for pinning a magnetization direction of the ferromagnetic layer, wherein both end portions of the magneto-resistive effect film form a junction taper shape and, at the both end portions forming the junction taper shape, a pair of bias magnetic field applying layers are disposed via underlayers for applying a longitudinal bias magnetic field to the soft magnetic layer, wherein each of the underlayers is formed by a thin film made of at least one element selected from the group consisting of Ru, Ti, Zr, Hf, and Zn or an alloy thin film containing, as a main component, at least one element selected from the group, and wherein each of the bias magnetic field applying layers formed on the underlayers is formed by a hard magnetic layer and has a thickness of 200 Å or less (not including zero).

As a preferred mode of the present invention, it is configured such that the thickness of each of the bias magnetic field applying layers is set to 150 to 200 Å.

As a preferred mode of the present invention, it is configured such that the magneto-resistive effect element is a spin-valve magneto-resistive effect element, and each of the underlayers is formed by a thin film made of Ti or an alloy thin film containing Ti as a main component.

As a preferred mode of the present invention, it is configured such that each of the bias magnetic field applying layers has a crystal structure of a hexagonal prism hexagonal system.

As a preferred mode of the present invention, it is configured such that each of the bias magnetic field applying layers is formed by a Co-based hard magnetic layer.

As a preferred mode of the present invention, it is configured such that the Co-based hard magnetic layer is made of CoPt, CoCrPt, CoCrTa or an alloy containing one of them.

As a preferred mode of the present invention, it is configured such that a taper angle θ of the junction taper shape at the both end portions of the magneto-resistive effect film is set to 45 to 85° with respect to a bottom reference surface.

As a preferred mode of the present invention, it is configured such that the thickness of each of the underlayers is set to 10 to 100 Å.

As a preferred mode of the present invention, it is configured such that the total thickness of the pinning layer, the ferromagnetic layer, the nonmagnetic layer, and the soft magnetic layer of the magneto-resistive effect film is set to 120 to 350 Å.

According to another aspect of the present invention, there is obtained a thin film magnetic head comprising a magneto-resistive effect element having a magneto-resistive effect film, wherein the magneto-resistive effect film is a multilayer film comprising a nonmagnetic layer, a ferromagnetic layer formed on one surface of the nonmagnetic layer, a soft magnetic layer formed on the other surface of the nonmagnetic layer, and a pinning layer formed so as to contact with one surface of the ferromagnetic layer (a surface of the ferromagnetic layer opposite to a surface thereof contacting with the nonmagnetic layer) for pinning a magnetization direction of the ferromagnetic layer, wherein both end portions of the magneto-resistive effect film form a junction taper shape and, at the both end portions forming the junction taper shape, a pair of first bias magnetic field applying layers are disposed via first underlayers for applying a longitudinal bias magnetic field to the soft magnetic layer, while, a pair of second bias magnetic field applying layers are disposed on the first bias magnetic field applying layers via second underlayers for applying a longitudinal bias magnetic field to the soft magnetic layer, wherein each of the first underlayers is formed by a thin film made of at least one element selected from the group consisting of Ru, Ti, Zr, Hf, and Zn or an alloy thin film containing, as a main component, at least one element selected from the group, wherein each of the second underlayers is formed by a thin film made of a material selected from the group consisting of Cr, CrTi, NiCr, TiW, FeCo, and FeCoMo, and wherein each of the first and second bias magnetic field applying layers is formed by a hard magnetic layer.

As a preferred mode of the present invention, it is configured such that each of the first and second bias magnetic field applying layers has a crystal structure of a hexagonal prism hexagonal system.

As a preferred mode of the present invention, it is configured such that each of the first and second bias magnetic field applying layers is formed by a Co-based hard magnetic layer.

As a preferred mode of the present invention, it is configured such that the thickness of each of the first bias magnetic field applying layers is set to 150 to 200 Å and the thickness of each of the second bias magnetic field applying layers is set to 150 to 300 Å.

As a preferred mode of the present invention, it is configured such that the thickness of each of the first underlayers is set to 10 to 100 Å and the thickness of each of the second underlayers is set to 10 to 100 Å.

According to another aspect of the present invention, there is obtained a head gimbal assembly comprising a slider including the foregoing thin film magnetic head and disposed so as to confront a recording medium, and a suspension elastically supporting the slider.

According to another aspect of the present invention, there is obtained a hard disk drive comprising a slider including the foregoing thin film magnetic head and disposed so as to confront a disc-shaped recording medium driven to be rotated, and a positioning device supporting the slider and positioning the slider relative to the recording medium.

DETAILED DESCRIPTION OF THE INVENTION

Now, specific embodiments of the present invention will be described in detail hereinbelow with reference to the drawings.

FIRST EMBODIMENT OF THE INVENTION

The gist of the present invention resides in a structure of a magneto-resistive effect element having a magneto-resistive effect film and incorporated in a reproducing head.

Figure 1:
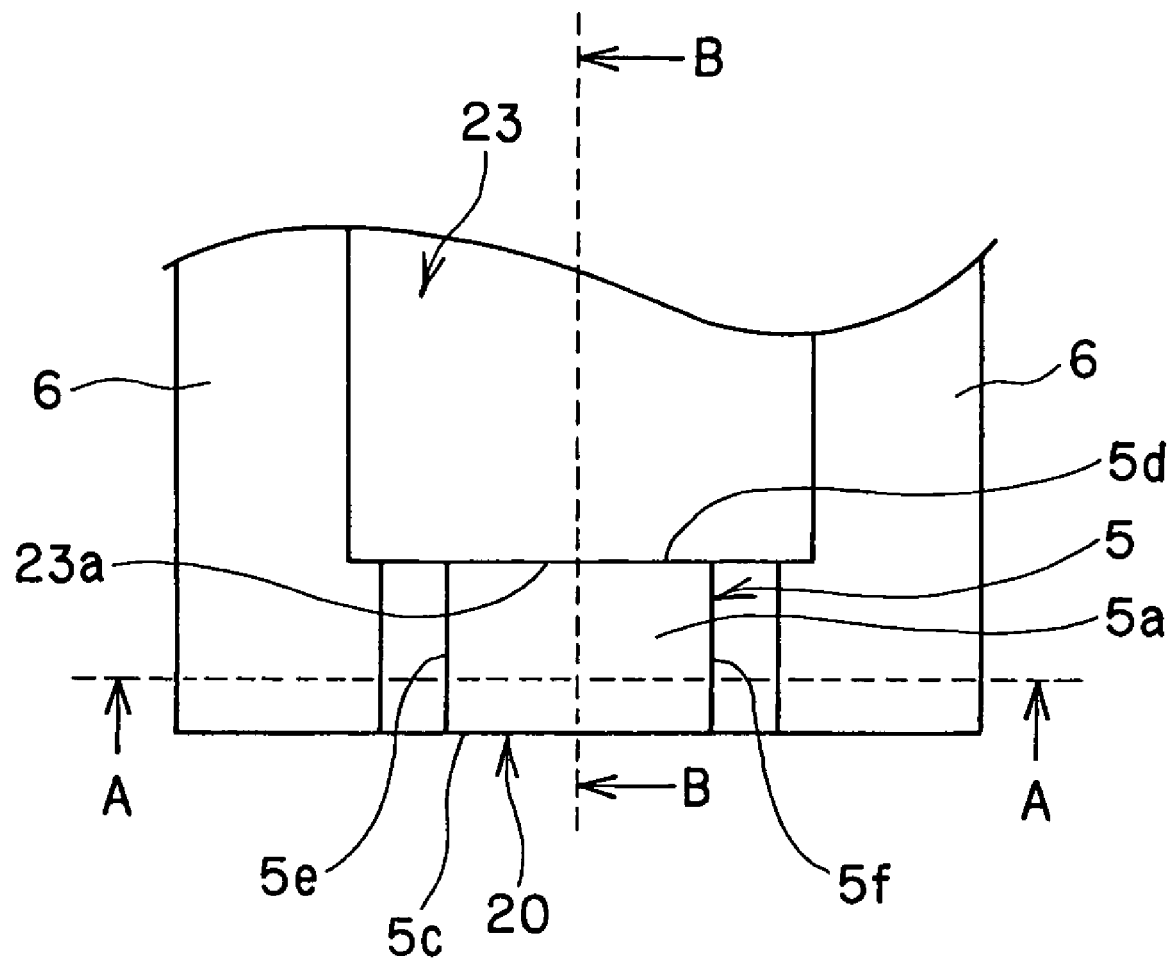
FIG. 1 is a plan view showing the main part of a reproducing head in an embodiment of the present invention.
Figure 2:
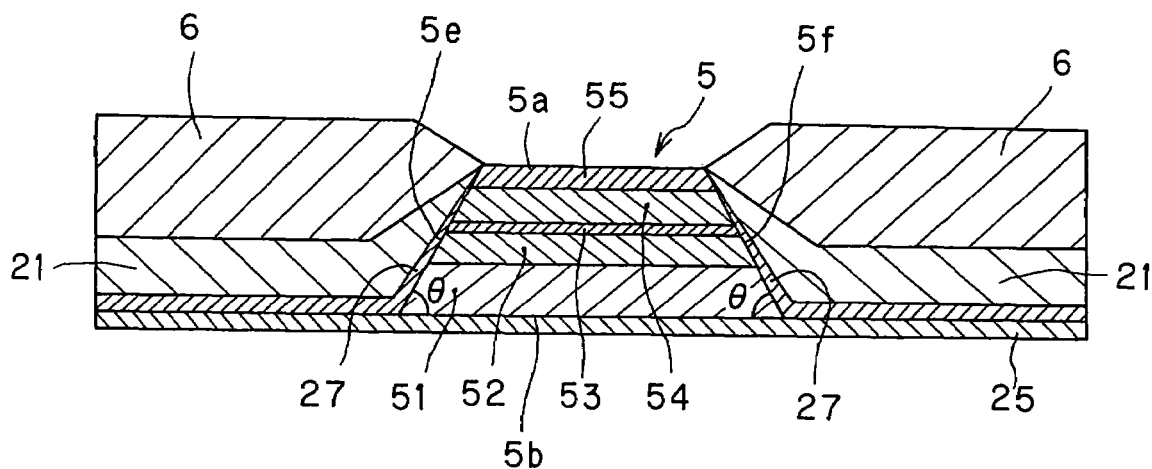
FIG. 2 is a sectional view taken along line A-A in FIG. 1.
Figure 3:
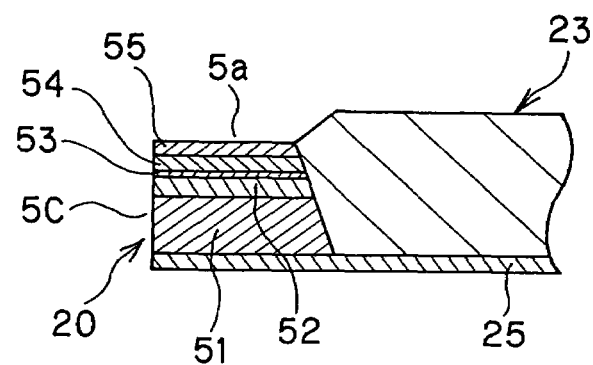
FIG. 3 is a sectional view taken along line B-B in FIG. 1.

FIG. 1 is a plan view showing the main part of a reproducing head in an embodiment of the present invention, FIG. 2 is a sectional view taken along line A-A in FIG. 1, and FIG. 3 is a sectional view taken along line B-B in FIG. 1.

As shown in FIG. 2, a magneto-resistive effect film 5 forming a magneto-resistive effect element (MR element) has a multilayer film structure comprising a nonmagnetic layer 53, a ferromagnetic layer 52 formed on one surface (in this embodiment, on the lower side in FIG. 2) of the nonmagnetic layer 53, a soft magnetic layer 54 formed on the other surface (in this embodiment, on the upper side in FIG. 2) of the nonmagnetic layer 53 and capable of acting to freely change a magnetization direction in response to an external magnetic field serving as magnetic information, and a pinning layer 51 formed so as to contact with one surface of the ferromagnetic layer 52 (a surface of the ferromagnetic layer 52 opposite to a surface thereof contacting with the nonmagnetic layer 53) for pinning a magnetization direction of the ferromagnetic layer 52.

The illustrated preferred example is of a so-called pinning layer bottom type spin-valve film structure in which the pinning layer 51 is located on the bottom side.

More specifically, it is the structure in which the pinning layer 51, the ferromagnetic layer 52, the nonmagnetic layer 53, the soft magnetic layer 54, and a protective layer 55 are stacked on a base underlayer 25 in the order named. The ferromagnetic layer 52 is a layer of which the magnetization direction is fixed, and is normally formed by a ferromagnetic film. The ferromagnetic layer 52 is not limited to the structure of the single layer, but may be of a multilayer structure that acts like a ferromagnetic film. For example, a stacked body of CoFe/Ru/CoFe can be cited as a preferred example.

The pinning layer 51 is a layer for fixing the magnetization direction in the ferromagnetic layer 52, and is normally formed by an antiferromagnetic film of PtMn or the like. The nonmagnetic layer 53 is formed by, for example, a Cu film. The soft magnetic layer 54 is a layer of which a magnetization direction changes depending on a signal magnetic field from a recording medium, and is normally formed by a soft magnetic film. The soft magnetic layer 54 is not limited to the structure of the single layer, but may be of a multilayer structure that acts like a soft magnetic film. For example, a stacked body of CoFe/NiFe can be cited as a preferred example.

As a material of the protective layer 55, Ta, for example, is used.

As shown in FIG. 2, both end portions 5e and 5f of the magneto-resistive effect film 5 forming the magneto-resistive effect element (MR element) in the present invention form a junction taper shape (tapered portion having a trapezoidal shape in section) and a taper angle θ of the junction taper shape is set to 45 to 85° relative to a bottom reference surface (e.g. a wafer substrate or the base underlayer serves as a reference), and preferably 60 to 80°. If this value becomes less than 45°, there arises a problem that a bias magnetic field is not effectively applied, while, if this value exceeds 80°, there arises a problem that a film adhesion state of underlayers or bias magnetic field applying layers on the junction taper portions is degraded.

In the present invention, on both end portions 5e and 5f forming such a junction taper shape, a pair of bias magnetic field applying layers 21 and 21 are disposed via underlayers 27 and 27, respectively, for applying a longitudinal bias magnetic field to the soft magnetic layer 54. That is, the underlayers 27 and 27 are provided at connecting portions between the magneto-resistive effect element and the bias magnetic field applying layers 21 and 21. The underlayers 27 and 27 are normally formed after the formation of the magneto-resistive effect element (MR element) and therefore partly formed also on the base underlayer 25 as shown in FIG. 2.

On the bias magnetic field applying layers 21 and 21, two electrode layers 6 and 6 are formed for causing a sense current, being a current for magnetic signal detection, to flow through the magneto-resistive effect film 5 forming the MR element. Each electrode layer 6 is made of a conductive material such as Au.

The gist of the present invention resides in the structure of the magneto-resistive effect element having the magneto-resistive effect film 5 and incorporated in the reproducing head and, in particular, in structures of each of the underlayers 27 and 27 and each of the bias magnetic field applying layers 21 and 21 disposed on both end portions of at least the soft magnetic layer of the magneto-resistive effect film.

Specifically, the underlayer 27 directly contacting with the bias magnetic field applying layer 21 as shown in FIG. 2 is formed by a thin film made of at least one element selected from a group of Ru, Ti, Zr, Hf, and Zn or an alloy thin film (e.g. RuCo) containing, as a main component, at least one element selected from the group. Among them, Ru, Ti, Zr, and RuCo (Co=18 to 22 at %) are particularly preferable. Under the underlayer 27 in the present invention, a film property initialization layer of Ta or the like may further be provided. The film property initialization layer of Ta or the like serves as a base layer for causing the underlayer 27 to securely exhibit its primary function.

The thickness of the underlayer 27 in the present invention is set to 10 to 100 Å, preferably 20 to 80 Å. If the thickness of the underlayer 27 becomes too thin, the effect of the underfilm placement is not exhibited, while, if the thickness of the underlayer 27 becomes too large, the application of the bias magnetic field is impeded.

Structure of Bias Magnetic Field Applying Layer 21

Figure 5:
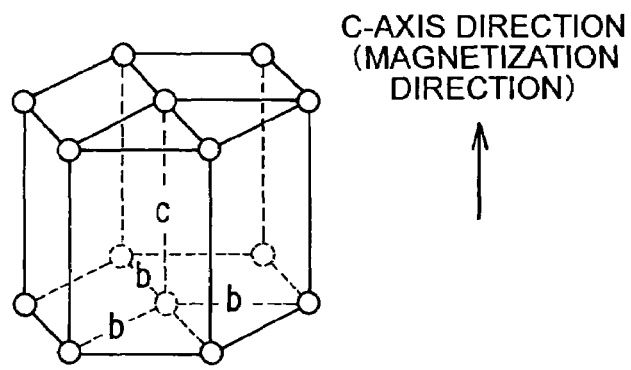
FIG. 5 is a diagram exemplarily showing a crystal structure of a hexagonal prism hexagonal system.

In the present invention, it is desirable that the bias magnetic field applying layer 21 formed on the underlayer 27 have a crystal structure of a hexagonal prism hexagonal system as illustrated in FIG. 5. In this crystal structure, a lattice constant in the hexagonal plane is represented by b, while a lattice constant in a height direction of the hexagonal prism is represented by c. The c-axis direction corresponds to a magnetization direction.

As a specific magnetic material for forming the bias magnetic field applying layer 21, there can be cited a Co-based hard magnetic layer containing Co as a main component, as a preferred example. More specifically, it is desirable to use CoPt, CoCrPt, CoCrTa, or an alloy containing one of them as a main component.

The thickness of the bias magnetic field applying layer 21 is set to 200 Å or less (not including zero), preferably 150 to 200 Å, and more preferably 160 to 180 Å. It is desirably thinner than the total thickness of the MR element.

Figure 6:
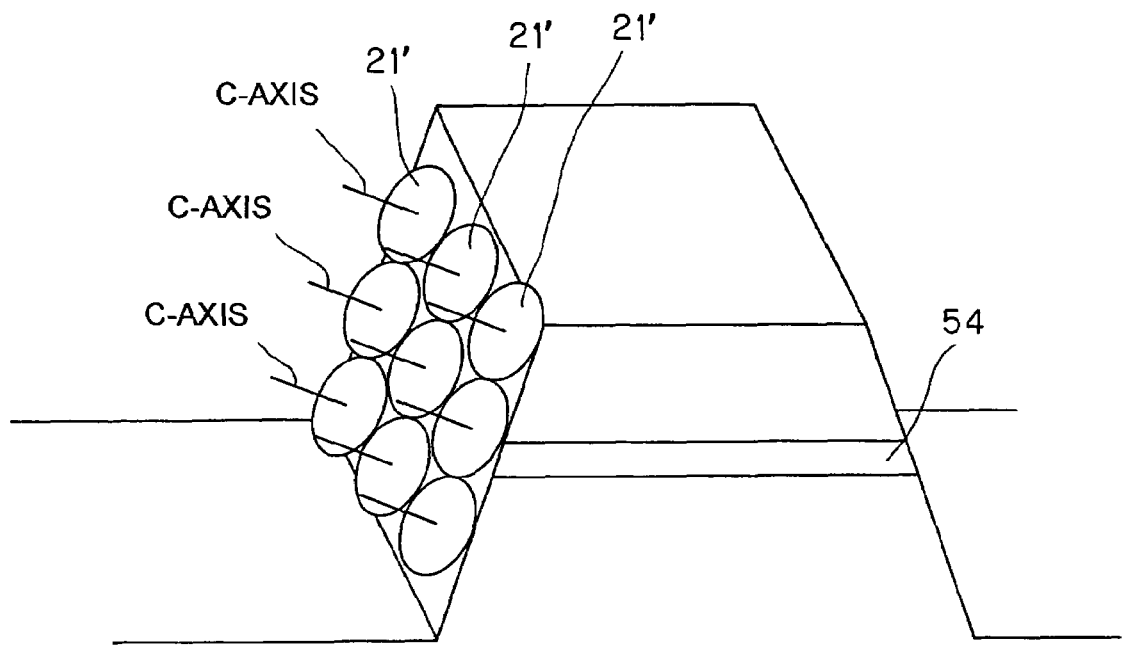
FIG. 6 is a diagram showing a deposition image, at a junction portion, of crystal grains (particularly orientation of c-axes) of a hexagonal prism hexagonal system forming a bias magnetic field applying layer of the present invention.
Figure 14:
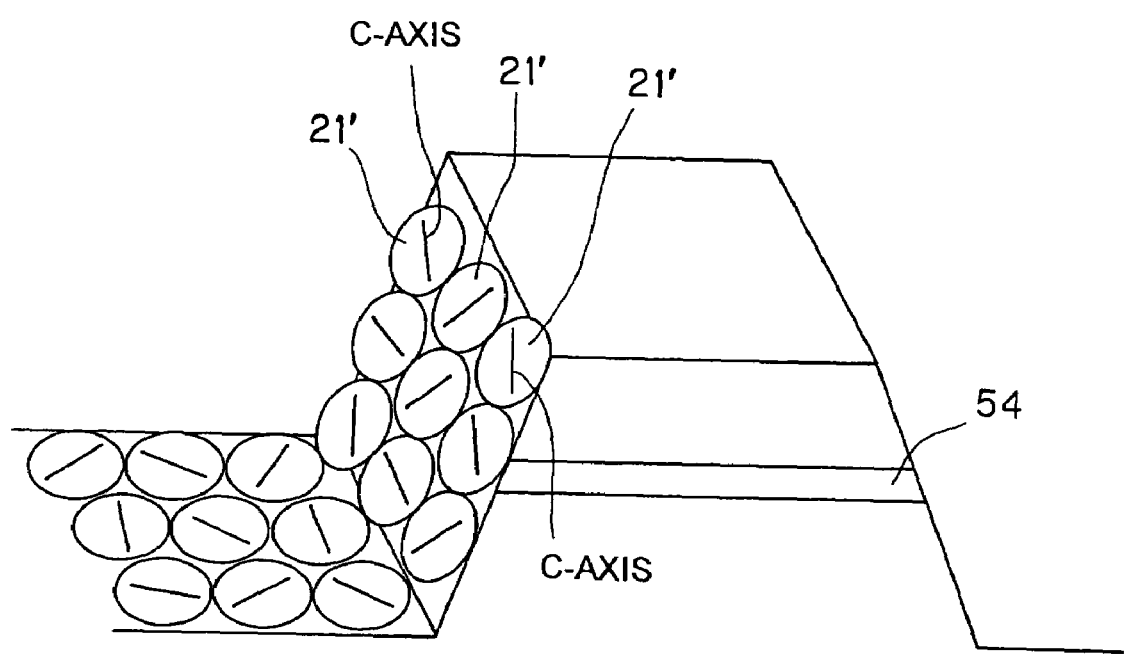
FIG. 14 is a diagram showing a deposition image, at a junction portion, of crystal grains (particularly orientation of c-axes) of a hexagonal prism hexagonal system forming a conventional bias magnetic field applying layer.

As a result of assiduous studies by the present inventors, by placing the underlayer 27 made of the material selected as described above, directly under the bias magnetic field applying layer 21 in advance, crystal grains 21' of the hexagonal prism hexagonal system forming the bias magnetic field applying layer 21 are deposited so that their c-axes being axes of easy magnetization are oriented in a direction approximately perpendicular to the tapered portion of the junction taper shape as shown in an image diagram of FIG. 6. That is, the c-axes being the axes of easy magnetization of the crystal grains 21' of the hexagonal prism hexagonal system are oriented in the track width direction and therefore the thin film magnetic head, which is strong and highly reliable in bias magnetic field and has uniform performance, is realized. As a reference diagram, FIG. 14 illustrates a deposition image of crystal grains 21' of the hexagonal prism hexagonal system forming a conventional bias magnetic field applying layer 21. According to this, it is understood that c-axes of the crystal grains 21' are approximately parallel to the tapered portion of the junction taper shape, and further, in-plane C-axis directions of the individual crystal grains are oriented randomly.

As a result of the reduction in size of the thin film magnetic head, the number of the crystal grains 21' of the hexagonal prism hexagonal system deposited on the junction taper shape portion is only a few so that the reliability of the head is largely affected depending on which direction their axes of easy magnetization are oriented in or whether or not their axes of easy magnetization are arranged with regularity.

When the thickness of the bias magnetic field applying layer 21 exceeds 200 Å, the bias magnetic field applying layer 21 deposited after exceeding such a thickness cannot orient its c-axes (axes of easy magnetization) substantially parallel to a bias magnetic field desirably given to the soft magnetic layer 54 (free layer). Therefore, there arises an inconvenience that, even by sacrificing the reproduction output by increasing the thickness of the bias magnetic field applying layer 21, it is not possible to achieve a corresponding effect of suppressing variation in reproduction waveform symmetry.

However, such an inconvenience caused by forming the bias magnetic field applying layer 21 by a single layer and increasing the thickness thereof more than necessary can be solved by a second embodiment of the present invention which will be described hereinbelow. In addition, it is possible to further improve the effect of the present invention.

SECOND EMBODIMENT OF THE INVENTION

Figure 4:
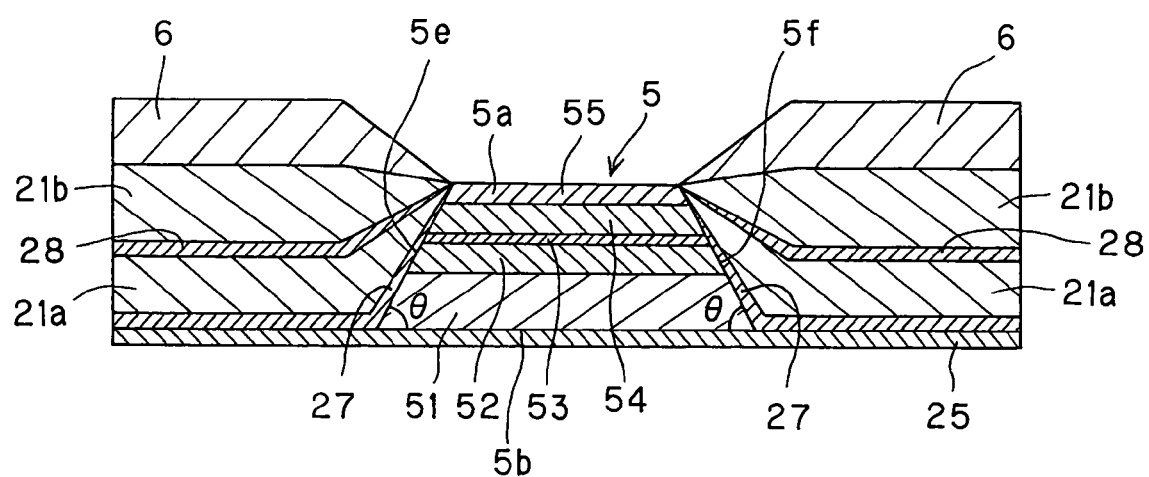
FIG. 4 is a diagram corresponding to FIG. 2 and showing a second embodiment of the present invention.

FIG. 4 shows the second embodiment of the present invention. In FIG. 4, the same symbols as those in FIG. 2 represent substantially the same components or members.

The second embodiment shown in FIG. 4 basically differs from the first embodiment shown in FIG. 2 in that a pair of first bias magnetic field applying layers 21*a* and 21*a* for applying a longitudinal bias magnetic field to a soft magnetic layer 54 are disposed on both end portions 5*e* and 5*f* forming a junction taper shape via first underlayers 27 and 27 and a pair of second bias magnetic field applying layers 21*b* and 21*b* for applying a longitudinal bias magnetic field to the soft magnetic layer 54 are disposed on the first bias magnetic field applying layers 21*a* and 21*a* via second underlayers 28 and 28.

Like in the first embodiment shown in FIG. 2, the first underlayer 27 is formed by a thin film made of at least one element selected from a group of Ru, Ti, Zr, Hf, and Zn or an alloy thin film containing, as a main component, at least one element selected from the group. Particularly preferable materials and thickness thereof are the same as those in the first embodiment.

It is desirable that the first bias magnetic field applying layer 21*a* directly formed on the first underlayer 27 have a crystal structure of a hexagonal prism hexagonal system like in the first embodiment shown in FIG. 2. That is, as a specific magnetic material for forming the first bias magnetic field applying layer 21*a*, there can be cited a Co-based hard magnetic layer containing Co as a main component, as a preferred example. It is desirable to use CoPt, CoCrPt, CoCrTa, or an alloy containing one of them as a main component.

The thickness of the first bias magnetic field applying layer 21*a* is set to 150 to 200 Å, and preferably 160 to 180 Å. When the thickness becomes less than the lower limit so as to be too thin, there arises a tendency that the effect of the bias magnetic field applying layer itself is not exhibited. On the other hand, when the thickness exceeds the upper limit so as to be too thick, there appears a tendency that c-axes for easy magnetization are oriented perpendicular with respect to the substrate surface as a reference at a portion remote from the junction and there arises a tendency that the c-axes are not oriented toward the track width direction so that a bias is not sufficiently applied as expected.

In terms of this, the second underlayer 28 is formed on the first bias magnetic field applying layer 21*a* and, on the second underlayer 28, the second bias magnetic field applying layer 21*b* is directly formed.

The second underlayer 28 is formed by a thin film made of a material selected from a group of Cr, CrTi, NiCr, TiW, FeCo, and FeCoMo. The thickness of the second underlayer 28 is set to 10 to 100 Å, and preferably 20 to 80 Å.

Under the second underlayer 28 in the present invention, a film property initialization layer of Ta or the like may further be provided. The film property initialization layer of Ta or the like serves as a base layer for causing the second underlayer 28 to securely exhibit its primary function.

It is desirable that the second bias magnetic field applying layer 21*b* directly formed on the second underlayer 28 have a crystal structure of a hexagonal prism hexagonal system like in the first embodiment shown in FIG. 2. That is, as a specific magnetic material for forming the second bias magnetic field applying layer 21*b*, there can be cited a Co-based hard magnetic layer containing Co as a main component, as a preferred example. It is desirable to use CoPt, CoCrPt, CoCrTa, or an alloy containing one of them as a main component.

The thickness of the second bias magnetic field applying layer 21*b* is set to 150 to 300 Å, and preferably 180 to 230 Å.

Under the influence of the second underlayer 28 directly placed under the second bias magnetic field applying layer 21*b*, there appears a tendency that c-axes for easy magnetization of crystal grains of the second bias magnetic field applying layer 21*b* are oriented substantially parallel with respect to the substrate surface as a reference. Accordingly, it is possible to avoid the inconvenience that the c-axes (axes for easy magnetization of the bias magnetic field applying layer) are not oriented toward the track width direction at a portion remote from the junction so that a bias is not sufficiently applied as expected when the bias magnetic field applying layer is formed too thick.

Since a magneto-resistive effect film 5 shown in FIG. 4 is substantially the same in structure as the magneto-resistive effect film 5 shown in FIG. 2 and having been described in detail, detailed description thereof is omitted herein.

Other Structural Portions of Reproducing Head

Supplementary description will be briefly made of the structure of the reproducing head illustrated in FIGS. 1 to 3.

In the embodiment illustrated in FIGS. 1 to 3, an alumina ($Al_2O_3$) layer 23 is disposed on a side of the MR element opposite to a side where an ABS (Air Bearing Surface) 20 is formed.

Further, the magneto-resistive effect film 5 forming the MR element has two surfaces 5*a* and 5*b* facing opposite sides, an end portion 5*c* located at the ABS 20, an end portion 5*d* on an opposite side relative to the end portion 5*c*, and two side portions 5*e* and 5*f* (both end portions forming the junction taper shape).

As described above, the bias magnetic field applying layers 21 and 21 are disposed so as to be adjacent to the side portions 5e and 5f of the magneto-resistive effect film 5 forming the MR element via the underlayers 27 and 27, respectively. As shown in FIG. 2, each underlayer 27 may be formed so as to extend not only over the side portion 5e or 5f of the magneto-resistive effect film 5, but also over the base underlayer 25 to thereby include a portion sandwiched between the bias magnetic field applying layer 21 and the base underlayer 25.

Each electrode layer 6 is disposed on the bias magnetic field applying layer 21 and, in a region where no bias magnetic field applying layer 21 is provided, the electrode layer 6 is disposed on a later-described lower shield gap film.

As shown in FIGS. 2 and 3, the magneto-resistive effect film 5 forming the MR element and the bias magnetic field applying layers 21 and 21 are disposed directly or indirectly on the base underlayer 25. The base underlayer 25 is disposed on the later-described lower shield gap film. As a material of the base underlayer 25, Ta or NiCr, for example, is used. Incidentally, the magneto-resistive effect film 5 and the bias magnetic field applying layers 21 and 21 may be disposed on the lower shield gap film without providing the base underlayer 25.

The multilayer film structure of the magneto-resistive effect film in the present invention is not limited to the foregoing so-called pinning layer bottom type spin-valve film structure in which the pinning layer 51 is located on the bottom side as shown in FIG. 2, and various modifications thereof may be made possible.

For example, it may be a so-called pinning layer top type spin-valve film structure wherein a pinning layer is disposed on the top side. Further, it may also be a so-called dual-type stacked film structure having two magnetism sensitive portions.

It is desirable that the total thickness of the pinning layer, the ferromagnetic layer, the nonmagnetic layer, and the soft magnetic layer be set to 150 to 350 Å.

In this invention, the term "a magneto-resistive effect element" is not limited to the foregoing spin-valve film structure, but represents a concept widely including such an element that exhibits a magneto-resistive effect, for example, a TMR element using a tunnel-type magneto-resistive effect, or a CPP (Current Perpendicular to Plane)-GMR element.

Overall Structure of Thin Film Magnetic Head

Figure 7:
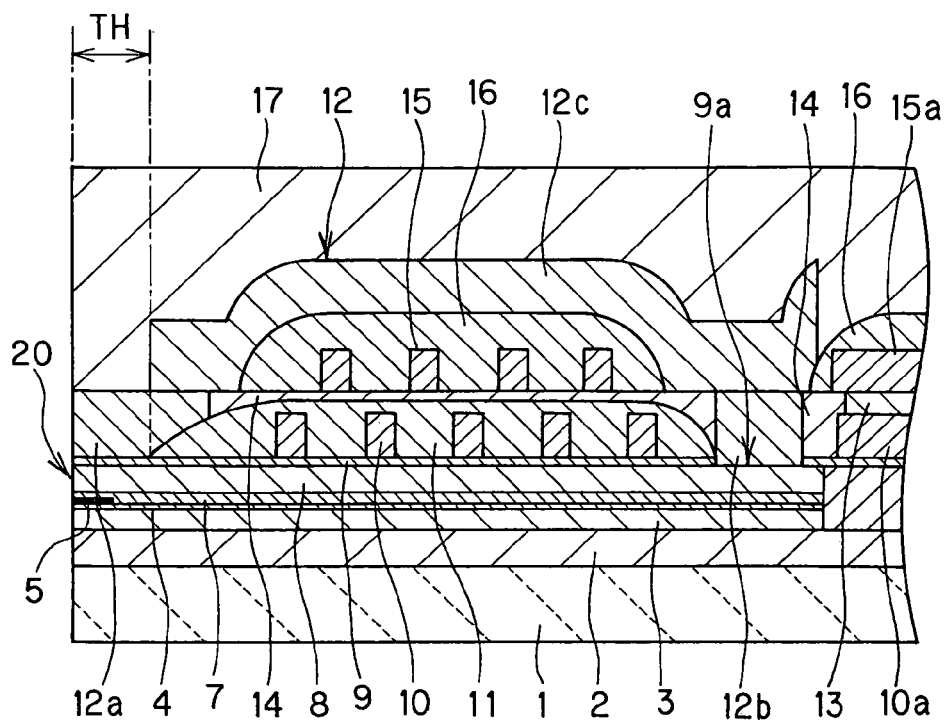
FIG. 7 is a diagram for describing a structure of a thin film magnetic head according to a preferred embodiment of the present invention, which shows a section of the thin film magnetic head perpendicular to an ABS and a substrate.
Figure 8:
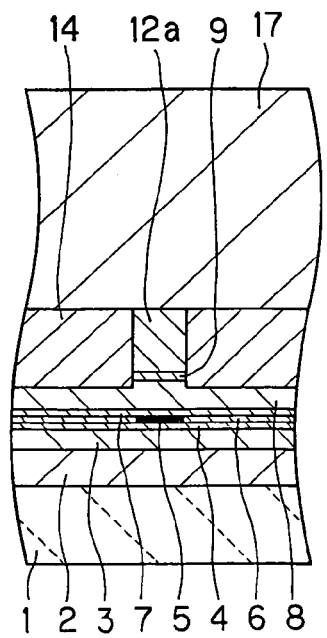
FIG. 8 is a diagram for describing a structure of the thin film magnetic head according to the preferred embodiment of the present invention, which shows a section of a magnetic pole portion of the thin film magnetic head parallel to the ABS.

Now, description will be made of the overall structure of a thin film magnetic head having the foregoing magneto-resistive effect element. FIGS. 7 and 8 are diagrams for describing the structure of the thin film magnetic head according to a preferred embodiment of the present invention, wherein FIG. 7 shows a section of the thin film magnetic head perpendicular to an ABS and a substrate, and FIG. 8 shows a section of a magnetic pole portion of the thin film magnetic head parallel to the ABS. Herein, the ABS represents a confronting surface of the thin film magnetic head confronting a magnetic recording medium.

It is expected that the overall structure of the thin film magnetic head can be easily understood by description along production processes thereof. To this end, the overall structure of the thin film magnetic head will be described hereinbelow on the basis of the production processes.

First, an insulating layer 2 made of an insulating material such as alumina ($Al_2O_3$) or silicon dioxide ($SiO_2$) is formed on a substrate 1 made of a ceramic material such as altic ($Al_2O_3$.Tic) by sputtering or the like. The thickness of the insulting layer 2 is set to, for example, about 0.5 to 20 μm.

Then, on the insulating layer 2 is formed a lower shield layer 3 for a reproducing head, made of a magnetic material. The thickness thereof is set to, for example, about 0.1 to 5 μm. As the magnetic material of the lower shield layer 3, there can be cited, for example, FeAlSi, NiFe, CoFe, CoFeNi, FeN, FeZrN, FeTaN, CoZrNb, or CoZrTa. The lower shield layer 3 is formed by sputtering, plating, or the like.

Then, a lower shield gap film 4 made of an insulating material such as $Al_2O_3$ or $SiO_2$ is formed on the lower shield layer 3 by sputtering or the like. The thickness thereof is set to, for example, about 10 to 200 nm.

Then, the magneto-resistive effect film 5 for reproduction, the electrode layers 6 and 6, the underlayers 27 and 27 (not illustrated), and the bias magnetic field applying layers 21 and 21 (not illustrated) are formed on the lower shield gap film 4 for forming the magneto-resistive effect element (magneto-resistive effect film 5).

Then, an upper shield gap film 7 made of an insulating material such as alumina is formed in a thickness of, for example, 10 to 200 nm on the MR element and the lower shield gap film 4 by sputtering or the like.

Then, an upper shield layer 8 of the reproducing head made of a magnetic material and serving also as a lower magnetic pole layer of a recording head is formed in a thickness of, for example, about 3 to 4 μm on the upper shield gap film 7. The magnetic material of the upper shield layer 8 may be the same as that of the foregoing lower shield layer 3. The upper shield layer 8 is formed by sputtering, plating, or the like.

Incidentally, the upper shield layer 8 may be replaced with an upper shield layer, a separation layer made of a nonmagnetic material such as alumina and formed on the upper shield layer by sputtering or the like, and a lower magnetic pole layer formed on the separation layer. This is an example of the structure wherein functions of a magnetic pole and a shield are not achieved by one layer, but achieved by separate layers.

Then, a recording gap layer 9 made of an insulating material such as alumina is formed in a thickness of, for example, 50 to 300 nm on the upper shield layer 8 by sputtering or the like.

Then, the recording gap layer 9 is partly etched to form a contact hole 9a at a central portion of a later-described thin film coil for forming a magnetic circuit.

Then, a first layer portion 10 of the thin film coil made of, for example, copper (Cu) is formed in a thickness of, for example, 2 to 3 μm on the recording gap layer 9. In FIG. 7, symbol 10a denotes a connecting portion of the first layer portion 10 that is connected to a later-described second layer portion 15 of the thin film coil. The first layer portion 10 is wound around the contact hole 9a.

Then, an insulating layer 11, such as a photoresist, made of an organic material having fluidity upon heating is formed into a predetermined pattern so as to cover the first layer portion 10 of the thin film coil and the recording gap layer 9 in a peripheral region thereof.

Then, a heat treatment is carried out at a predetermined temperature for flattening the surface of the insulating layer 11. By this heat treatment, respective edge portions on the outer periphery and inner periphery of the insulating layer 11 are formed into a rounded slope shape.

Then, in a region from a slope portion of the insulating layer 11 on the side of the later-described ABS 20 over the side of the ABS 20, a track width regulating layer 12a of an upper magnetic pole layer 12 is formed on the recording gap layer 9 and the insulating layer 11 using a magnetic material for the recording head. The upper magnetic pole layer 12 comprises the track width regulating layer 12a, a later-described coupling portion layer 12b, and a later-described yoke portion layer 12c.

The track width regulating layer 12a has a tip portion formed on the recording gap layer 9 and serving as a magnetic pole portion of the upper magnetic pole layer 12, and a connecting portion formed on the slope portion of the insulating layer 11 on the side of the ABS 20 and connected to the yoke portion layer 12c. The width of the tip portion is set equal to a recording track width. The width of the connecting portion is set larger than the width of the tip portion.

Upon forming the track width regulating layer 12a, the coupling portion layer 12b made of a magnetic material is simultaneously formed on the contact hole 9a, and further, a connection layer 13 made of a magnetic material is simultaneously formed on the connecting portion 10a. The coupling portion layer 12b constitutes a portion of the upper magnetic pole layer 12, which is magnetically coupled to the upper shield layer 8.

Then, magnetic pole trimming is carried out. Specifically, in a peripheral region of the track width regulating layer 12a, at least part of the recording gap layer 9 and a magnetic pole portion of the upper shield layer 8 on the side of the recording gap layer 9 is etched using the track width regulating layer 12a as a mask. Thereby, as shown in FIG. 8, a trim structure is formed wherein respective widths of at least part of the magnetic pole portion of the upper magnetic pole layer 12, the recording gap layer 9, and the magnetic pole portion of the upper shield layer 8 are made even. According to this trim structure, it is possible to prevent the increase in effective track width which is caused by spreading of magnetic flux in the neighborhood of the recording gap layer 9.

Then, an insulating layer 14 made of an inorganic insulating material such as alumina is formed over the whole in a thickness of, for example, 3 to 4 μm.

Then, the insulating layer 14 is polished by, for example, chemical mechanical polishing to the surfaces of the track width regulating layer 12a, the coupling portion layer 12b, and the connection layer 13, to thereby carry out flattening.

Then, on the flattened insulating layer 14, the second layer portion 15 of the thin film coil made of, for example, copper (Cu) is formed in a thickness of, for example, 2 to 3 μm. In FIG. 7, symbol 15a denotes a connecting portion of the second layer portion 15, which is connected to the connecting portion 10a of the first layer portion 10 of the thin film coil via the connection layer 13. The second layer portion 15 is wound around the coupling portion layer 12b.

Then, an insulating layer 16, such as a photoresist, made of an organic material having fluidity upon heating is formed into a predetermined pattern so as to cover the second layer portion 15 of the thin film coil and the insulating layer 14 in a peripheral region thereof.

Then, a heat treatment is carried out at a predetermined temperature for flattening the surface of the insulating layer 16. By this heat treatment, respective edge portions on the outer periphery and inner periphery of the insulating layer 16 are formed into a rounded slope shape.

Then, the yoke portion layer 12c forming a yoke portion of the upper magnetic pole layer 12 is formed on the track width regulating layer 12a, the insulating layers 14 and 16, and the coupling portion layer 12b, using a magnetic material for the recording head such as Permalloy. An end portion of the yoke portion layer 12c on the side of the ABS 20 is located at a position apart from the ABS 20. The yoke portion layer 12c is connected to the upper shield layer 8 via the coupling portion layer 12b.

Then, an overcoat layer 17 made of, for example, alumina is formed so as to cover the whole. Finally, mechanical processing is applied to a slider including the foregoing respective layers to form the ABS 20 of the thin film magnetic head including the recording head and the reproducing head, so that the thin film magnetic head is completed.

The thin film magnetic head thus produced comprises the confronting surface (ABS 20) confronting the recording medium, the reproducing head, and the recording head (induction-type electromagnetic transducer element). The reproducing head comprises the MR element (magneto-resistive effect film 5), and the lower shield layer 3 and the upper shield layer 8 for shielding the MR element (magneto-resistive effect film 5). The lower shield layer 3 and the upper shield layer 8 have portions on the side of the ABS 20, which are disposed to confront each other with the MR element (magneto-resistive effect film 5) sandwiched therebetween.

The recording head includes the magnetic pole portions confronting each other on the side of the ABS 20, and comprises the lower magnetic pole layer (upper shield layer 8) and the upper magnetic pole layer 12 magnetically coupled to each other, the recording gap layer 9 provided between the magnetic pole portion of the lower magnetic pole layer and the magnetic pole portion of the upper magnetic pole layer 12, and the thin film coil 10, 15 of which at least part is disposed between the lower magnetic pole layer and the upper magnetic pole layer 12 in an insulated manner against them. In this thin film magnetic head, as shown in FIG. 7, the length from the ABS 20 to an end of the insulating layer 11 on the side of the ABS 20 becomes a throat height (identified by symbol TH in FIG. 7). The throat height represents a length (height) from the ABS 20 to a position where an interval between the two magnetic pole layers starts to increase.

Operation of Thin Film Magnetic Head

Now, description will be made of an operation of the thin film magnetic head according to this embodiment. The thin film magnetic head records information on the recording medium using the recording head, while reproduces information recorded on the recording medium using the reproducing head.

In the reproducing head, a direction of a longitudinal bias magnetic field applied by the bias magnetic field applying layers 21 and 21 is the same as the track width direction. In the MR element, a magnetization direction of the soft magnetic layer 54 is set to the direction of the bias magnetic field in the state where no signal magnetic field exists. On the other hand, a magnetization direction of the ferromagnetic layer 52 is fixed to the direction perpendicular to the ABS 20.

In the MR element, the magnetization direction of the soft magnetic layer 54 changes depending on a signal magnetic field from the recording medium, so that a relative angle between the magnetization direction of the soft magnetic layer 54 and the magnetization direction of the ferromagnetic layer 52 changes, and consequently, a resistance value of the MR element changes. The resistance value of the MR element can be derived from a potential difference between the two electrode layers 6 and 6 when a sense current is caused to flow through the MR element by the two electrode layers 6 and 6. In this manner, the information recorded on the recording medium can be reproduced by the reproducing head.

As shown in FIG. 2, on both end potions (junction taper portion) of at least the soft magnetic layer 54 of the magneto-resistive effect film 5 in the present invention, the pair of bias magnetic field applying layers 21 and 21 for applying a longitudinal bias magnetic field to the soft magnetic layer 54 are disposed via the underlayers 27 and 27. Through the action of the underlayers 27 and 27, the axes for easy magnetization of crystal grains forming the bias magnetic field applying layers 21 and 21 near the junction are oriented toward the track width direction. Therefore, it is possible to provide a thin film magnetic head that produces a large reproduction output even with thin bias magnetic field applying layers, that is excellent in reproduction waveform symmetry with a little variation in reproduction waveform symmetry, and that achieves a small occurrence rate of the Barkhausen noise.

Head Gimbal Assembly and Hard Disk Drive

Hereinbelow, description will be made of a head gimbal assembly and a hard disk drive according to an embodiment of the present invention.

Figure 9:
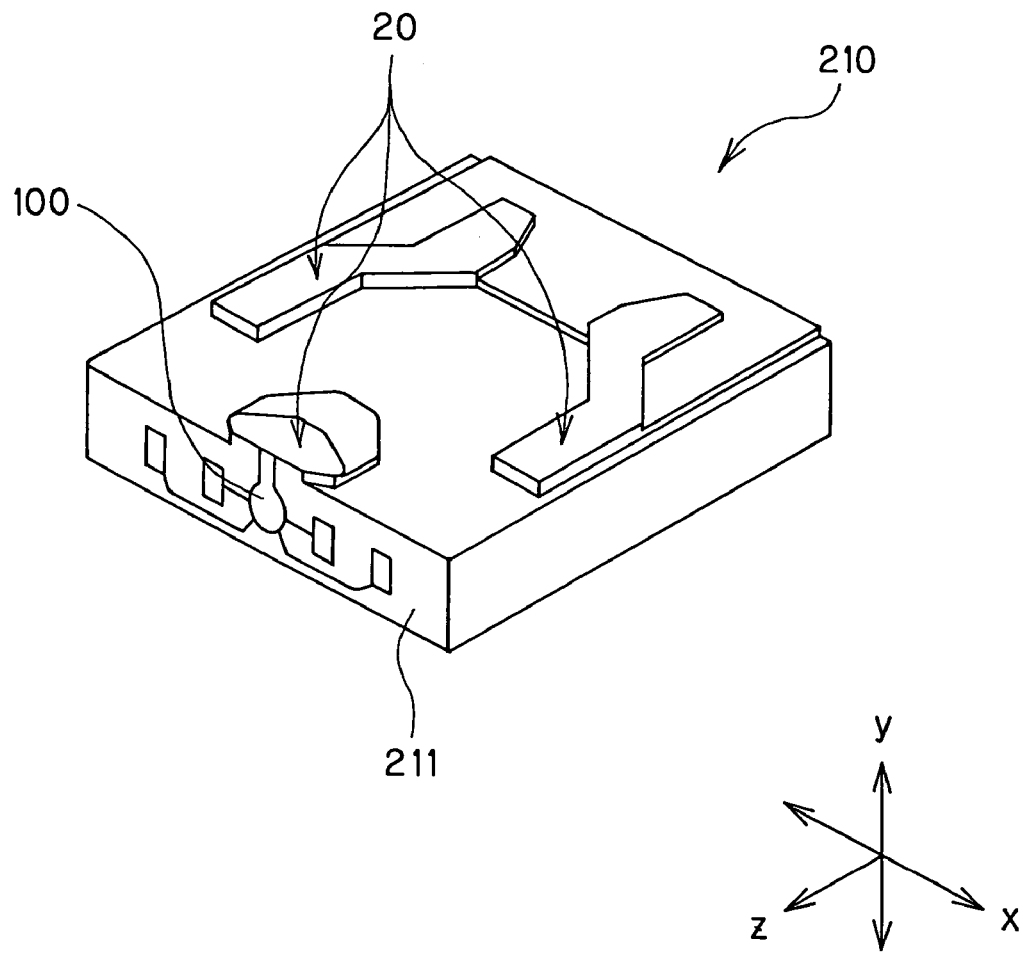
FIG. 9 is a perspective view showing a slider included in a head gimbal assembly in an embodiment of the present invention.

Referring first to FIG. 9, a slider 210 included in the head gimbal assembly will be described. In the hard disk drive, the slider 210 is disposed so as to confront a hard disk serving as a disc-shaped recording medium and driven to be rotated. The slider 210 comprises a base body 211 mainly composed of the substrate 1 and the overcoat layer 17 in FIG. 7.

The base body 211 has a generally hexahedral shape. One surface, among six surfaces, of the base body 211 is arranged to confront the hard disk. This one surface is formed with the ABS 20.

When the hard disk is rotated in a z-direction in FIG. 9, lift is generated below the slider 210 in a y-direction in FIG. 9 because of an air flow passing between the hard disk and the slider 210. This lift causes the slider 210 to rise from the surface of the hard disk. Incidentally, an x-direction in FIG. 9 represents a track traverse direction of the hard disk.

A thin film magnetic head 100 according to this embodiment is formed in the neighborhood of an end portion (lower-left end portion in FIG. 9) of the slider 210 on an air exit side thereof.

Figure 10:
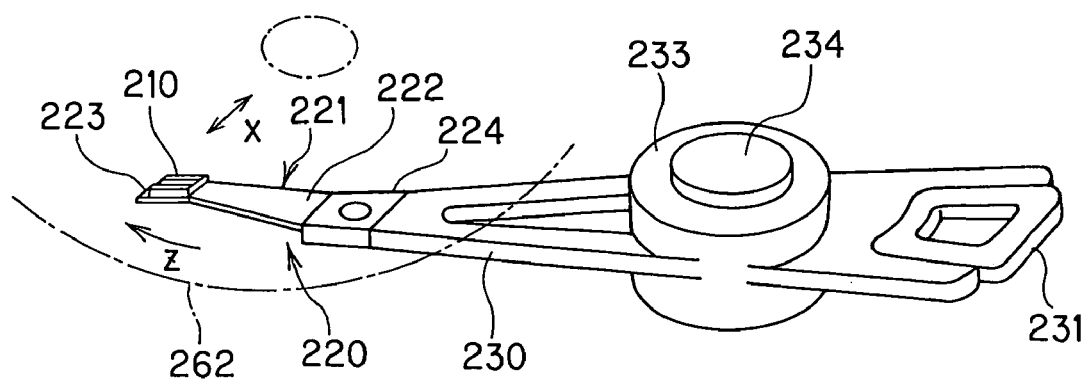
FIG. 10 is a perspective view showing a head arm assembly including the head gimbal assembly in the embodiment of the present invention.

Referring now to FIG. 10, description will be made of a head gimbal assembly 220 according to this embodiment. The head gimbal assembly 220 comprises the slider 210, and a suspension 221 elastically supporting the slider 210. The suspension 221 comprises a load beam 222 in the form of a blade spring made of, for example, stainless steel, a flexure 223 provided at one end of the load beam 222 and joined with the slider for giving a suitable degree of freedom to the slider 210, and a base plate 224 provided at the other end of the load beam 222.

The base plate 224 is adapted to be attached to an arm 230 of an actuator for moving the slider 210 in the track traverse direction x of a hard disk 262. The actuator comprises the arm 230 and a voice coil motor for driving the arm 230. In the flexure 223, a portion where the slider 210 is mounted, is provided with a gimbal portion for keeping constant a posture of the slider 210.

The head gimbal assembly 220 is attached to the arm 230 of the actuator. An assembly in which the head gimbal assembly 220 is attached to one arm 230 is called a head arm assembly. On the other hand, an assembly in which a carriage has a plurality of arms and the head gimbal assembly 220 is attached to each of the arms is called a head stack assembly.

FIG. 10 shows one example of the head arm assembly. In this head arm assembly, the head gimbal assembly 220 is attached to one end of the arm 230. To the other end of the arm 230 is attached a coil 231 forming part of the voice coil motor. At an intermediate portion of the arm 230 is provided a bearing portion 233 that is mounted on a shaft 234 for pivotally supporting the arm 230.

Figure 11:
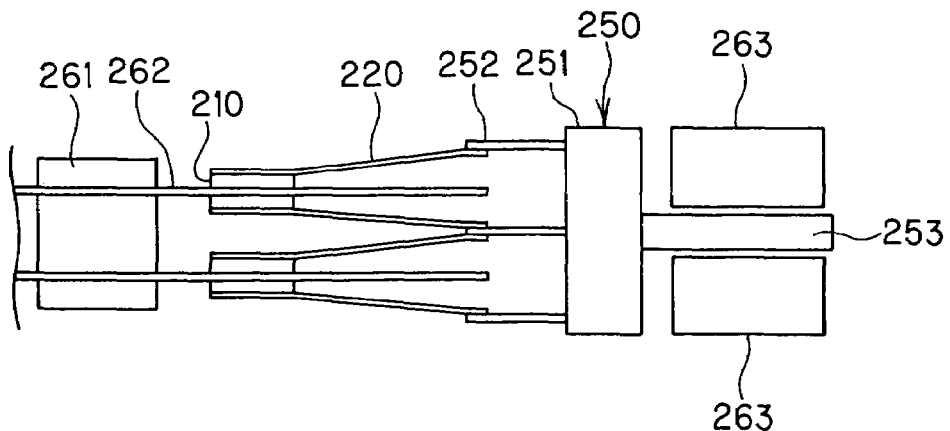
FIG. 11 is an explanatory diagram showing the main part of a hard disk drive in the embodiment of the present invention.
Figure 12:
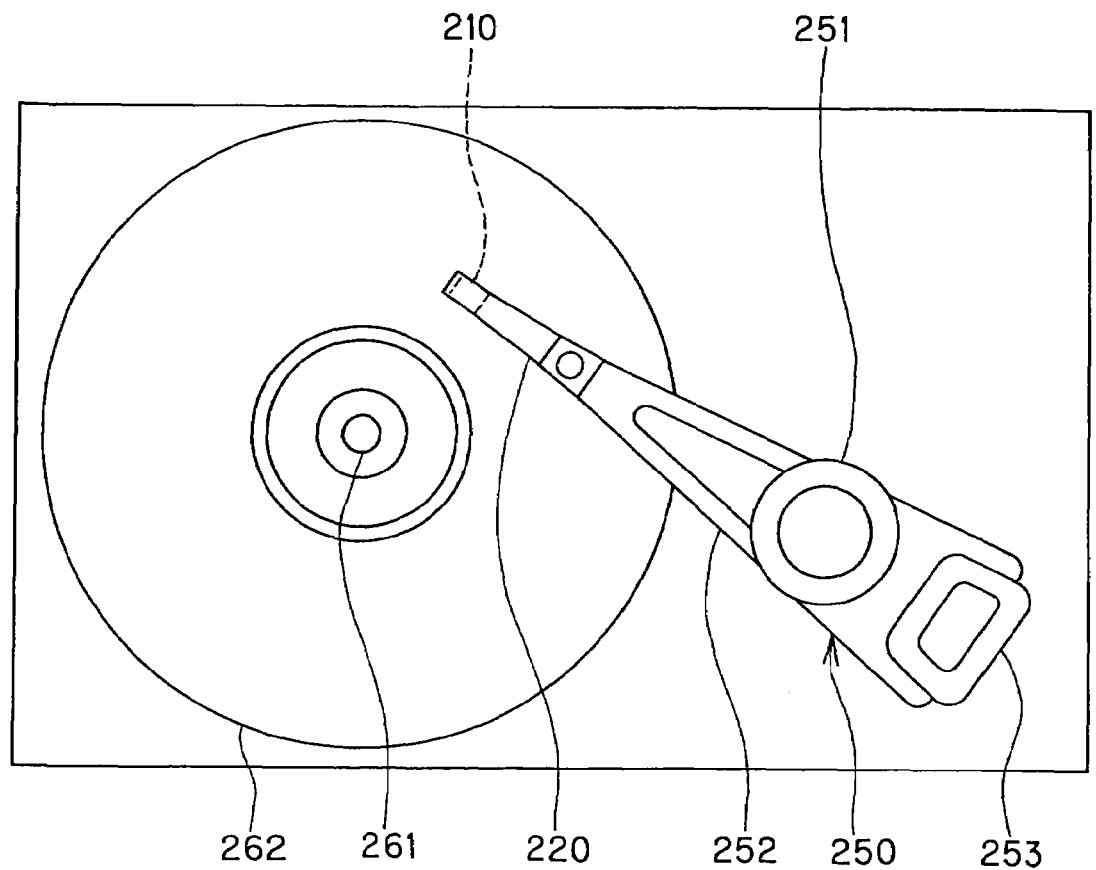
FIG. 12 is a plan view of the hard disk drive in the embodiment of the present invention.

Referring now to FIGS. 11 and 12, description will be made of one example of the head stack assembly and the hard disk drive according to this embodiment.

FIG. 11 is an explanatory diagram showing the main part of the hard disk drive, while FIG. 12 is a plan view of the hard disk drive.

A head stack assembly 250 comprises a carriage 251 having a plurality of arms 252. A plurality of head gimbal assemblies 220 are attached to the arms 252 so as to be adjacent to each other in the vertical direction with an interval therebetween. A coil 253 forming part of a voice coil motor is attached to the carriage 251 on the opposite side relative to the arms 252. The head stack assembly 250 is incorporated into the hard disk drive.

The hard disk drive has a plurality of hard disks 262 mounted on a spindle motor 261. Two sliders 210 are disposed for each of the hard disks 262 so as to confront each other with the hard disk 262 interposed therebetween. The voice coil motor has permanent magnets 263 that are disposed at positions to confront each other with the coil 253 interposed therebetween.

The head stack assembly 250 excluding the sliders 210 and the actuator correspond to a positioning device in the present invention and serve to support the sliders 210 and to position the sliders 210 relative to the hard disks 262.

In the hard disk drive according to this embodiment, the sliders 210 are moved in the track traverse direction of the hard disks 262 and positioned relative to the hard disks 262 by the use of the actuator. The thin film magnetic head included in the slider 210 records information on the hard disk 262 using the recording head, while reproduces information recorded on the hard disk 262 using the reproducing head.

The head gimbal assembly and the hard disk drive according to this embodiment achieve the effect like that achieved by the thin film magnetic head according to the foregoing embodiment.

The description has been made of the thin film magnetic head having the structure wherein the reproducing head is formed on the side of the substrate, then the recording head is stacked thereon. However, this stacking order may be reversed. Further, when used only for reading, the thin film magnetic head may be configured to have only the reproducing head.

Hereinbelow, specific examples of experiments will be shown to describe the structure of the thin film magnetic head of the present invention in further detail.

[Experiment I]

In Experiment I, head samples in the foregoing first embodiment shown in FIG. 2 were prepared in the following manner and an experiment was carried out for comparison between the present invention and the prior art.

EXAMPLE 1

Reproducing head samples were prepared each having a pinning layer bottom type spin-valve magneto-resistive effect element in which a pinning layer 51 is located at the bottom as shown in FIG. 2. Hereinbelow, only the principal part of the experiment will be described.

As shown in FIG. 7, a lower shield layer 3 of NiFe was formed, then a lower shield gap film 4 of $Al_2O_3$ was formed thereon, and then a stacked film constituting a magneto-resistive effect element was formed thereon. Specifically, on the lower shield gap film 4 of $Al_2O_3$ was formed the stacked film (total thickness; 221 Å) composed of a base underlayer 25 (NiCr; thickness 50 Å), a pinning layer 51 (IrMn antiferromagnetic layer; thickness 70 Å), a ferromagnetic layer 52 (ferromagnetic layer made of a three-layer stacked body of CoFe (thickness 15 Å)/Ru (thickness 8 Å)/CoFe (thickness 15 Å)), a nonmagnetic layer 53 (Cu; thickness 17 Å), a soft magnetic layer 54 (CoFe (thickness 20 Å)), a protective layer (Ru; thickness 5 Å) and a protective layer (Ta; thickness 20 Å).

Fixation of a magnetization direction of the ferromagnetic layer 52 by the pinning layer 51 was carried out in a vacuum by a heat treatment wherein a temperature was 270° C., an applied magnetic field was 790 kA/m (10 kOe), and a treatment time was 5 hours.

Then, a mask was formed on the magneto-resistive effect film for defining a shape of the MR element by etching. This mask was formed by patterning a resist layer made of two organic films to have a shape with an undercut to make a bottom surface smaller than an upper surface.

The magneto-resistive effect film was selectively subjected to dry etching such as ion milling by the use of the mask to thereby obtain a patterned magneto-resistive effect film. Then, underlayers 27 and 27 (Ru; thickness 50 Å for each) and bias magnetic field applying layers 21 and 21 ($CO_{78}Cr_9Pt_{13}$(at %); thickness for each was changed in the range of 100 to 350 Å as shown in Table 1) were formed. Under each underlayer 27, Ta was placed in a thickness of 50 Å as a film property identification layer. In Table 1 below, the underlayer is indicated as also containing this Ta.

Then, electrode layers 6 and 6 (Au; thickness 40 nm for each) were formed on the bias magnetic field applying layers 21 and 21.

The magnitude of the reproduction track width was set to 100 nm as an optical track width.

The bias magnetic field applying layers 21 and 21 were magnetized under the magnetization condition at room temperature in a magnetic field of 948 kA/m (12 kOe) for 60 seconds, and applied a longitudinal bias magnetic field to the soft magnetic layer 54.

On such an MR element were formed an upper shield gap film of $Al_2O_3$ and an upper shield layer of NiFe, thereby preparing each of reproducing head samples necessary for the experiment.

Note that a taper angle θ of a junction taper shape at both end portions of the magneto-resistive effect film was set to 800 relative to the bottom reference surface.

EXAMPLE 2

In Example 1, the material of each underlayer was changed from Ru to Ti. Other than this, head samples of Example 2 were prepared in the same manner as in Example 1 (like in Example 1, the thickness of each bias magnetic field applying layer 21 was changed in the range of 100 to 350 Å as shown in Table 1).

EXAMPLE 3

In Example 1, the material of each underlayer was changed from Ru to $Ru_{80}CO_{20}$(at %). Other than this, head samples of Example 3 were prepared in the same manner as in Example 1 (like in Example 1, the thickness of each bias magnetic field applying layer 21 was changed in the range of 100 to 350 Å as shown in Table 1).

EXAMPLE 4

In Example 1, the material of each underlayer was changed from Ru to Zr. Other than this, head samples of Example 4 were prepared in the same manner as in Example 1 (like in Example 1, the thickness of each bias magnetic field applying layer 21 was changed in the range of 100 to 350 Å as shown in Table 1).

COMPARATIVE EXAMPLE 1

In Example 1, the material of each underlayer was changed from Ru to $Cr_{80}Ti_{20}$(at %). Other than this, head samples of Comparative Example 1 were prepared in the same manner as in Example 1 (like in Example 1, the thickness of each bias magnetic field applying layer 21 was changed in the range of 100 to 350 Å as shown in Table 1).

Using the reproducing head samples thus prepared, (1) Solitary Wave Reproduction Output (mV/pp), (2) Asym-σ (%), and (3) Barkhausen Noise Occurrence Rate (%) were derived in the following manner.

(1) Solitary Wave Reproduction Output (mV/pp)

Using a spin stand, a 3.5-inch recording medium was rotated at 7200 rpm to fly the sample head thereover and writing was performed on one track of the recording medium at a frequency of 1 MHz. Thereafter, a sense current of 3 mA was caused to flow through the sample head to thereby measure the average reproduction output of one track.

(2) Asym-σ (%)

Dynamic property performance was measured with respect to all samples (number of samples: 120) per type. After deriving symmetry of output waveforms, the degrees of asymmetry of the output waveforms were indicated in percent (%), then these asymmetry percent (%) were graphed to thereby derive standard deviations. A smaller standard deviation represents a sample group with less asymmetry of the output waveforms.

(3) Barkhausen Noise Occurrence Rate (%)

The occurrence rate (%) of the Barkhausen noise (BHN) was defined as a rate of the number of times of detection of noise when reproduction was repeated 1000 times.

The results of the measurement are shown in Table 1 below.

[Table 1]

TABLE 1

|  | Underlayer | CoCrPt Film Thickness (Å) | Solitary Wave Reproduction Output (mVpp) | Asym-σ (%) | BHN Occurrence Rate (%) |
|---|---|---|---|---|---|
| Example 1 | Ta/Ru | 100 | 1.04 | 20.0 | 4.7 |
|  | Ta/Ru | 125 | 0.91 | 17.0 | 3.1 |
|  | Ta/Ru | 150 | 0.76 | 12.5 | 2.3 |
|  | Ta/Ru | 200 | 0.67 | 9.8 | 1.3 |
|  | Ta/Ru | 250 | 0.56 | 8.9 | 0.7 |
|  | Ta/Ru | 300 | 0.45 | 8.5 | 0.8 |
|  | Ta/Ru | 350 | 0.39 | 7.4 | 0.7 |
| Example 2 | Ta/Ti | 100 | 0.97 | 21.3 | 5.9 |
|  | Ta/Ti | 125 | 0.87 | 17.3 | 4.7 |
|  | Ta/Ti | 150 | 0.79 | 14.3 | 3.6 |
|  | Ta/Ti | 200 | 0.60 | 8.5 | 2.4 |
|  | Ta/Ti | 250 | 0.52 | 7.7 | 1.8 |
|  | Ta/Ti | 300 | 0.49 | 8.2 | 1.4 |
|  | Ta/Ti | 350 | 0.40 | 7.4 | 1.2 |
| Example 3 | Ta/RuCo | 100 | 1.02 | 23.4 | 5.3 |
|  | Ta/RuCo | 125 | 0.96 | 19.3 | 3.9 |
|  | Ta/RuCo | 150 | 0.84 | 16.0 | 2.9 |
|  | Ta/RuCo | 200 | 0.69 | 11.1 | 1.9 |
|  | Ta/RuCo | 250 | 0.63 | 9.7 | 1.4 |
|  | Ta/RuCo | 300 | 0.53 | 8.4 | 1.2 |
|  | Ta/RuCo | 350 | 0.42 | 6.6 | 1.0 |
| Example 4 | Ta/Zr | 100 | 1.28 | 30.5 | 4.9 |
|  | Ta/Zr | 125 | 1.21 | 28.0 | 3.8 |
|  | Ta/Zr | 150 | 1.06 | 23.0 | 2.6 |
|  | Ta/Zr | 200 | 0.85 | 15.7 | 1.4 |
|  | Ta/Zr | 250 | 0.80 | 12.6 | 1.0 |
|  | Ta/Zr | 300 | 0.68 | 9.9 | 0.8 |
|  | Ta/Zr | 350 | 0.53 | 8.6 | 0.7 |
| Comp. Example 1 | Ta/CrTi | 100 | 1.42 | 39.8 | 23.4 |
|  | Ta/CrTi | 125 | 1.28 | 33.9 | 11.3 |
|  | Ta/CrTi | 150 | 1.10 | 30.5 | 5.2 |
|  | Ta/CrTi | 200 | 0.85 | 22.6 | 2.3 |
|  | Ta/CrTi | 250 | 0.72 | 16.3 | 1.7 |
|  | Ta/CrTi | 300 | 0.64 | 13.0 | 1.3 |
|  | Ta/CrTi | 350 | 0.53 | 10.8 | 1.4 |

From the results of Table 1, it is understood that a relationship of so-called trade-off tends to exist wherein as the reproduction output value improves, the value of Asym-σ becomes worse. However, it is seen that, in the case of the present invention, the value of Asym-σ tends to become smaller with the same output value as compared with Comparative Example 1 being the prior art. It is further seen that, even in a region where the thickness of the hard magnetic layer (CoCrPt) being the bias magnetic field applying layer is thin, the occurrence rate of the Barkhausen noise is low. That is, the present invention is quite advantageous in terms of achieving higher performance and reduction in size of the element.

In the present invention, in a region of large thickness (250 Å to 350 Å) where the thickness of the hard magnetic layer (CoCrPt) being the bias magnetic field applying layer exceeds 200 Å, although the output in the trade-off relationship is sacrificed, there is no corresponding improvement in value of Asym-σ. This is because it is considered that those components that are magnetized perpendicular to the substrate exist at a portion remote from the junction (c-axes are not oriented in the direction perpendicular to the junction surface). An example for improving such an inconvenience will be shown in Experiment II next.

[Experiment II]

In Experiment II, head samples in the foregoing second embodiment shown in FIG. 4 were prepared and an experiment was carried out for confirming that further property improvement of the present invention can be achieved.

Specifically, Ta (thickness 30 Å)/CrTi (second underlayer; thickness 30 Å)/CoCrPt (second bias magnetic field applying layer; thickness 200 Å) was further stacked on each of first underlayers and each of first bias magnetic field applying layers (thickness for each was changed in the range of 100 to 250 Å) shown in Table 2 below, thereby preparing each of second embodiment head samples (Example 5).

With respect to these samples, (1) Solitary Wave Reproduction Output (mV/pp), (2) Asym-σ (%), and (3) Barkhausen Noise Occurrence Rate (%) were derived using the same method as in Experiment I.

[Table 2]

TABLE 2

| | Underlayer | CoCrPt Film Thickness (Å) | Solitary Wave Reproduction Output (mVpp) | Asym-σ (%) | BHN Occurrence Rate (%) |
|---|---|---|---|---|---|
| Second Embodiment (Example 5) | Ta/Ru | 100 | 0.897 | 14.1 | 3.12 |
| | Ta/Ru | 125 | 0.753 | 11.1 | 1.8 |
| | Ta/Ru | 150 | 0.627 | 9.1 | 0.9 |
| | Ta/Ru | 200 | 0.545 | 7.2 | 0.7 |
| | Ta/Ru | 250 | 0.441 | 5.5 | 0.8 |

Ta30/CrTi30/CoCrPt200 was further stacked on an underlayer-CoCrPt film structure of Table 2.

Figure 13:
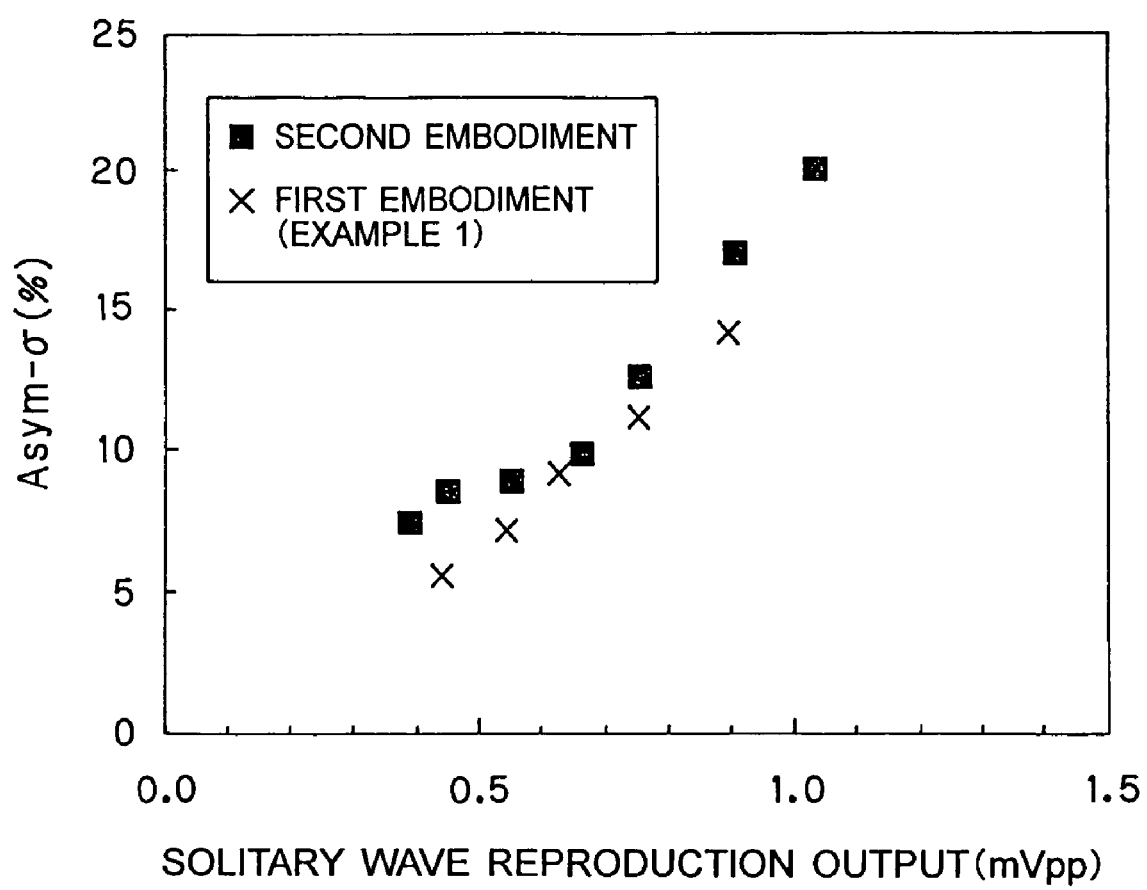
FIG. 13 is a graph showing the results of Table 2.

A relationship between the solitary wave reproduction output (mVpp) and Asym-σ (%) in Table 2 is shown in a graph of FIG. 13. For reference, data of Example 1 is also shown in FIG. 13. As understood from Table 2 and the graph of FIG. 13, it is considered that the second bias magnetic field applying layer is formed such that axes for easy magnetization are oriented parallel to the film surface, and thus the property exhibited when the first bias magnetic field applying layer is thick has been improved. That is, when the solitary wave reproduction output (mVpp) has the same value, Asym-σ (%) takes a smaller value.

As described above in detail, in the thin film magnetic head of the present invention, since the film design around the bias magnetic field applying layers is carried out so that the optimum bias magnetic field can be achieved in response to the reduction in thickness of the whole element, it is possible to provide the thin film magnetic head that produces the large reproduction output even with the thin bias magnetic field applying layers, that is excellent in reproduction waveform symmetry with a little variation in reproduction waveform symmetry, and that achieves a small occurrence rate of the Barkhausen noise.

What is claimed is:

1. A thin film magnetic head, comprising:
    a magneto-resistive effect element having a magneto-resistive effect film, wherein said magneto-resistive effect film is a multilayer film comprising
        a protective layer;
        a soft magnetic layer in direct contact with a bottom surface of the protective layer;
        a nonmagnetic layer in direct contact with a bottom surface of the soft magnetic layer;
        a ferromagnetic layer in direct contact with a bottom surface of the nonmagnetic layer; and
        a pinning layer formed so as to be in direct contact with a bottom surface of said ferromagnetic layer for pinning a magnetization direction of said ferromagnetic layer,
    wherein both end portions of said magneto-resistive effect film form a junction taper shape and, at said both end portions forming the junction taper shape, a pair of bias magnetic field applying layers are disposed via underlayers for applying a longitudinal bias magnetic field to said soft magnetic layer,
    said pinning layer does not extend beyond said end portions of said magneto-resistive effect film forming a junction taper shape,
    each of said underlayers is formed by a thin film made of at least one element selected from the group consisting of Ru, Zr, Hf, and Zn or an alloy thin film containing, as a main component, at least one element selected from said group, and
    each of said bias magnetic field applying layers formed on said underlayers is formed by a hard magnetic layer and has a thickness of 200 Å or less.

2. The thin film magnetic head according to claim 1, wherein each of said bias magnetic field applying layers has a thickness of 150 to 200 Å.

3. The thin film magnetic head according to claim 1, wherein each of said bias magnetic field applying layers has a crystal structure of a hexagonal prism hexagonal system.

4. The thin film magnetic head according to 1, wherein each of said bias magnetic field applying layers is formed by a Co-based hard magnetic layer.

5. The thin film magnetic head according to claim 4, wherein said Co-based hard magnetic layer is made of CoPt, CoCrPt, CoCrTa or an alloy containing one of them.

6. The thin film magnetic head according to claim 1, wherein a taper angle θ of the junction taper shape at said both end portions of said magneto-resistive effect film is set to 45 to 85° with respect to a bottom reference surface.

7. The thin film magnetic head according to claim 1, wherein each of said underlayers has a thickness of 10 to 100 Å.

8. The thin film magnetic head according to claim 1, wherein a total thickness of said pinning layer, said ferromagnetic layer, said nonmagnetic layer, and said soft magnetic layer of said magneto-resistive effect film is 120 to 350 Å.

9. A head gimbal assembly comprising:

a slider including a thin film magnetic head and disposed so as to confront a recording medium; and a suspension elastically supporting said slider, wherein said thin film magnetic head comprises a magneto-resistive effect element having a magneto-resistive effect film, and said magneto-resistive effect film is a multilayer film comprising a protective layer;

a soft magnetic layer in direct contact with a bottom surface of the protective layer;

a nonmagnetic layer in direct contact with a bottom surface of the soft magnetic layer;

a ferromagnetic layer in direct contact with a bottom surface of the nonmagnetic layer; and a pinning layer formed so as to be in direct contact with a bottom surface of said ferromagnetic layer for pinning a magnetization direction of said ferromagnetic layer, wherein both end portions of said magneto-resistive effect film form a junction taper shape and, at said both end portions forming the junction taper shape, a pair of bias magnetic field applying layers are disposed via underlayers for applying a longitudinal bias magnetic field to said soft magnetic layer, said pinning layer does not extend beyond said end portions of said magneto-resistive effect film forming a junction taper shape, each of said underlayers is formed by a thin film made of at least one element selected from the group consisting of Ru, Zr, Hf and Zn or an alloy thin film containing, as a main component, at least one element selected from said group, and each of said bias magnetic field applying layers formed on said underlayers is formed by a hard magnetic layer and has a thickness of 200 Å or less.

10. A hard disk drive comprising:

a slider including a thin film magnetic head and disposed so as to confront a disc-shaped recording medium driven to be rotated; and a positioning device supporting said slider and positioning said slider relative to said recording medium, wherein said thin film magnetic head comprises a magneto-resistive effect element having a magneto-resistive effect film, and said magneto-resistive effect film is a multilayer film comprising a protective layer;

a soft magnetic layer in direct contact with a bottom surface of the protective layer;

a nonmagnetic layer in direct contact with a bottom surface of the soft magnetic layer;

a ferromagnetic layer in direct contact with a bottom surface of the nonmagnetic layer; and a pinning layer formed so as to be in direct contact with a bottom surface of said ferromagnetic layer for pinning a magnetization direction of said ferromagnetic layer, wherein both end portions of said magneto-resistive effect film form a junction taper shape and, at said both end portions forming the junction taper shape, a pair of bias magnetic field applying layers are disposed via underlayers for applying a longitudinal bias magnetic field to said soft magnetic layer, said pinning layer does not extend beyond said end portions of said magneto-resistive effect film forming a junction taper shape, each of said underlayers is formed by a thin film made of at least one element selected from the group consisting of Ru, Zr, Hf, and Zn or an alloy thin film containing, as a main component, at least one element selected from said group, and each of said bias magnetic field applying layers formed on said underlayers is formed by a hard magnetic layer and has a thickness of 200 Å or less.

* * * * *